March 12, 1968   F. J. COLVILLE ET AL   3,372,874
JET NOZZLE
Filed Oct. 18, 1965

Inventors
Francis Jeffrey Colville
Norman Roberts
By
Cushman, Darby & Cushman
Attorney

United States Patent Office 3,372,874
Patented Mar. 12, 1968

3,372,874
JET NOZZLE
Francis Jeffrey Colville, Sutton-in-Ashfield, and Norman Roberts, Hucknall, England, assignors to Rolls-Royce Limited, Derby, England, a British company
Filed Oct. 18, 1965, Ser. No. 497,121
Claims priority, application Great Britain, Nov. 9, 1964, 45,670/64
9 Claims. (Cl. 239—127.3)

ABSTRACT OF THE DISCLOSURE

A jet nozzle assembly for use on gas turbine engines employed in supersonic aircraft propulsion, the jet nozzle assembly including a cylindrical outer casing and an inner body mounted coaxially within the outer casing and spaced therefrom to define an annular space through which jet gases flow, the inner body having an opening at its downstream end for discharging of cooling air, the cooling air being supplied to the inner body by conduit means extending through and sealed from the annular space. An additional nozzle is provided within the inner body and is disposed therein and connected to a source of high pressure fluid for inducing flow of cooling air through the inner body and out of its downstream opening.

---

This invention concerns a jet nozzle e.g. for use on a gas turbine engine adapted to be employed for supersonic aircraft propulsion.

According to the present invention, there is provided a jet nozzle having a substantially cylindrical outer casing within which is mounted an inner body which is spaced from the outer casing by an annular space through which the jet gases may flow, and means for producing a flow of cooling air through at least part of the interior of the inner body.

Preferably the inner body is of bulbous shape, and means are provided for effecting relative movement between the outer casing and the inner body so that the jet nozzle may be formed, as required, into either a convergent or a convergent-divergent jet nozzle.

The inner body is preferably provided with an outlet nozzle which communicates with the said interior or part thereof, the inner body being formed to permit a flow of cooling air to be drawn through the said outlet nozzle and so through the said interior or part thereof, and means for supplying the outlet nozzle with high pressure air or gas so as to induce the said flow of cooling air to be drawn through the outlet nozzle. The said outlet nozzle is preferably disposed at the downstream end of the inner body.

The whole interior of the inner body may be open to the said flow of cooling air.

Alternatively, the inner body may be divided by an internal wall into an upstream and a downstream compartment, the said flow of cooling air passing to the downstream compartment after flowing through a tube which extends through but whose interior does not communicate with the upstream compartment, whereby the upstream and downstream compartments may be maintained at different pressures.

The said upstream compartment may have one or more movable parts and means for moving the latter with respect to the remainder of the upstream compartment so as to vary the shape of the said annular space, means being provided for reducing or eliminating any resultant loads due to pressure differences across the or each said movable part so as to minimise the force required to move the latter. Thus, there may be means for establishing communication between the said annular space and the upstream compartment.

The upstream compartment may have two axially consecutive sets of the said movable parts which may be moved towards and away from the central axis of the inner body so as to vary the cross sectional area of the throat of the jet nozzle.

The invention also comprises a gas turbine engine provided with a jet nozzle as set forth above.

The invention is illustrated, merely by way of example, in the accompanying drawings, in which.

Figure 1:
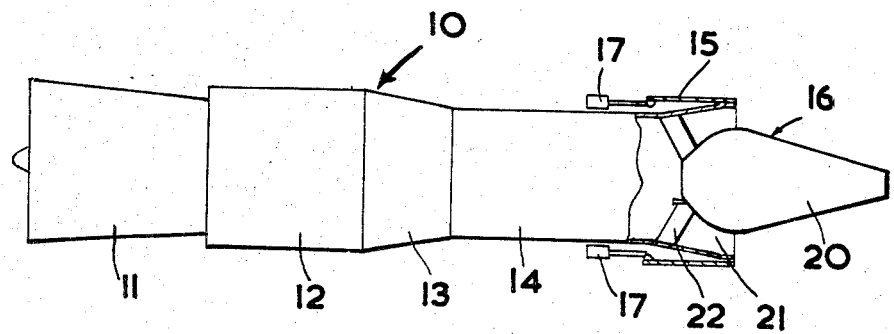
FIGURE 1 is a diagrammatic view, partly in section, of a gas turbine engine provided with a jet nozzle according to the present invention.

In FIGURE 1 there is shown a supersonic gas turbine engine 10 having a compressor 11, combustion equipment 12, a turbine 13, and a jet pipe 14, all arranged in flow series.

Mounted about the downstream end of the jet pipe 14 is a cylindrical outer casing 15 which forms part of a jet nozzle 16. The outer casing 15 is slidable over the jet pipe 14 by means of rams 17.

The jet nozzle 16 has a bulbous inner body 20 whose upstream end is mounted within the downstream end of the jet pipe 14, and thus within the outer casing 15, and which is spaced therefrom by an annular space 21 through which may pass the jet gases of the engine. The inner body 20 is supported within the jet pipe 14 by a plurality of angularly spaced apart hollow struts 22 defining cooling air conduit means.

Figure 2:
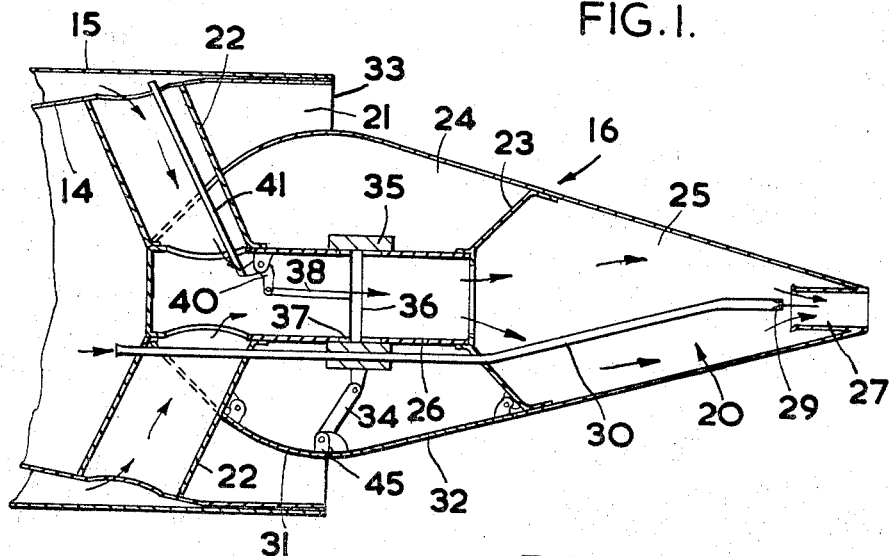
FIGURE 2 is a broken-away sectional view on a larger scale of the jet nozzle shown in FIGURE 1.

The outer casing 15 may be moved in a downstream direction from the position shown in FIGURE 2, in which the nozzle has a convergent form, towards another position, shown in FIGURE 1, in which the nozzle has a convergent-divergent form.

As shown in FIGURE 2, the inner body 20 is divided by an internal wall 23 into an upstream compartment 24 and a downstream compartment 25. A tube 26 extend through the upstream compartment 24, but the interior of the tube 26 does not communicate with that of the compartment 24. The upstream end of the tube 26 is supported by the struts 22 while the downstream end of the tube 2 supports the internal wall 23.

Ambient air may flow through the interiors of the hollow struts 22 and thence through the interior of the tube 26 to the downstream compartment 25. Such a flow of a serves to cool the struts 22, the tube 26 and the downstream compartment 25.

An outlet tube or opening 27 is mounted at and communicates with the downstream end of the downstream compartment 25. The said flow of air may thus pass out through the outlet tube 27.

Compressed air from the compressor 11, or exhaust gas from the jet pipe 14, is supplied to the outlet tube 2 through a tube 30 and through an outlet nozzle 29 the downstream end of tube 30. The resulting flow compressed air or exhaust gas through the outlet nozzle 29 induces a flow of cooling air to be drawn through the struts 22 and to pass thence through the tube 26 so as fill and cool the downstream compartment 25 and exhaust through the tube 27. As will be appreciated, the upstream compartment 24 will not be so filled with cooling air that it may be maintained at a different pressure from that of the downstream compartment 25.

The upstream compartment 24 has two axially consecutive sets of pivotally movable parts 31, 32, which m be moved towards and away from the central axis of t inner body 20 so as to vary the cross sectional area of the throat 33 of the jet nozzle 16.

Each pair of movable parts 31, 32 is connected by a linkage 34 to a sleeve 35 which is slidably mounted on the tube 26.

A bar 36 extends diametrically across the interior of the sleeve 35 and is slidably mounted in slots 37 in the tube 26. The sleeve 35 is of such a length that it covers and seals slots 37 in any actuated position and thereby isolates the interior of tube 26 from compartment 24. The bar 36 is pivotally connected to one end of a link 38 whose other end is pivotally connected to one arm of a bell crank lever 40. The other arm of the bell crank lever 40 is pivotally connected to a link 41 which may be moved by a ram (not shown). Accordingly sliding movement may be effected of the sleeve 35 over the tube 26, and hence movement of the movable parts 31, 32 so as to vary the cross-sectional area of the throat 33 of the jet nozzle 16.

It is desirable to ensure that any unbalanced loads due to pressure differences across the movable parts 31, 32 is as small as possible, so as to minimise the force required to move them into the path of the jet gases. One way in which this may be done is illustrated in FIGURE 2, in which the movable parts 31, 32 instead of being sealed to each other, as would be normal practice, have a gap 45 between them for establishing communication between the annular space 21 and the interior of the upstream compartment 24. The pressure differential between the annular space 21 and the upstream compartment 24 is thus arranged to provide a minimal unbalanced net load on movable parts 31, 32.

The same effect could, of course, be achieved by drilling holes (not shown) in the parts 31, 32 or in parts of the compartment 24 adjacent thereto.

Figure 3:
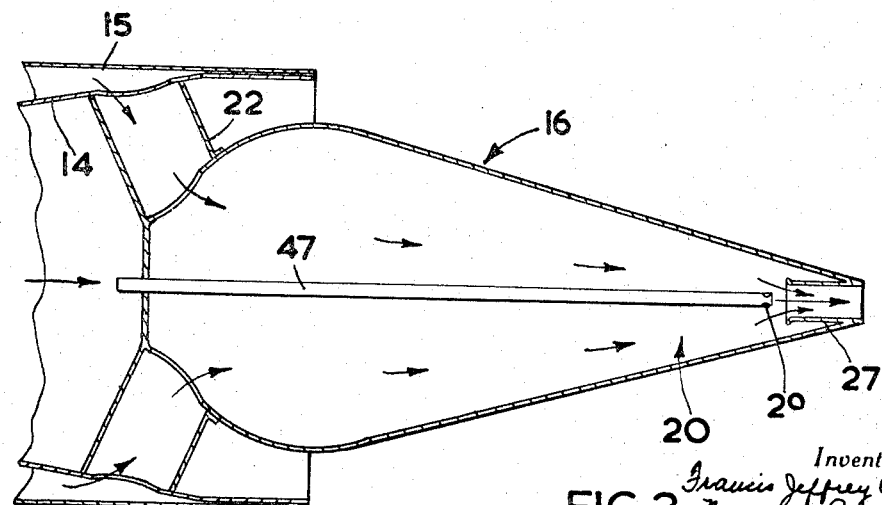
FIGURE 3 is a broken-away sectional view which is similar to FIGURE 2, but which illustrates an alternative embodiment.

An alternative embodiment of the present invention is shown in FIGURE 3, in which like reference numerals are used to indicate like parts.

In FIGURE 3 the inner body 20 is shown as being provided with the movable parts 31, 32.

The FIGURE 3 construction does not employ an internal wall 23 and accordingly the whole interior of the inner body 20 is open to the flow of cooling air therethrough. The said flow of cooling air thus reaches the interior of the inner body 20 directly from the interiors of the struts 22 since no tube 26 is employed. In the FIGURE 3 construction moreover, an axially located tube is employed to convey the compressed air or exhaust gas to the outlet tube 27 so as to induce the flow of cooling air therethrough.

The jet nozzle according to the invention could be arranged so that the flow of cooling air would normally proceed under the ram effect of the motion relative to the ambient air of the vehicle to which the nozzle is attached. When the vehicle velocity is zero or small, for example when the vehicle is an aircraft during take-off, and the ram effect is accordingly undesirably small the said cooling air flow-producing means can be operated to augment the flow of cooling air through the inner body.

We claim:

1. A jet nozzle assembly for discharging jet gases, said nozzle assembly having a substantially cylindrical outer casing, an inner body mounted coaxially within said outer casing and spaced therefrom to define an annular space through which jet gases may flow, said inner body having a hollow interior and having an opening at the downstream end thereof, an outlet nozzle positioned within said inner body and communicating with at least a part of the interior of said inner body, cooling air conduit means extending through and sealed from said annular space and communicating with the said at least one part of the interior for supplying cooling air thereto, and supply means connected to and supplying said outlet nozzle with a high pressure fluid to induce a flow of cooling air to be drawn through said conduit means into the said at least one part of the interior of said inner body and then discharged through the downstream opening of said inner body.

2. A jet nozzle assembly as claimed in claim 1 in which the inner body is of bulbous shape, and means are provided to effect relative movement between the outer casing and the inner body to form the nozzle assembly selectively into a convergent and a convergent-divergent jet nozzle.

3. A jet nozzle assembly as claimed in claim 1 in which the outlet nozzle is disposed adjacent the downstream opening of the inner body.

4. A jet assembly as claimed in claim 1 in which the whole interior of the inner body is open to the said flow of cooling air.

5. A jet nozzle assembly as claimed in claim 1 in which an internal wall divides the inner body into an upstream and downstream compartment, said cooling air conduit means including a tube extending through but whose interior is out of communication with the upstream compartment, said tube opening to the downstream compartment, whereby the upstream and downstream compartments may be maintained at different pressures.

6. A jet nozzle assembly as claimed in claim 5 in which the said upstream compartment has at least one movable part and means for moving the latter with respect to the remainder of the upstream compartment to vary the shape of the said annular space, and means for reducing any resultant loads due to pressure differences across said at least one movable part to minimise the force required to move the latter.

7. A jet nozzle assembly as claimed in claim 6 comprising inlet means for establishing communication between the said annular space and the upstream compartment.

8. A jet nozzle assembly as claimed in claim 6 in which the upstream compartment has two axially consecutive circumferential sets of movable parts which may be moved towards and away from the central axis of the inner body to vary the cross-sectional area of the throat of the jet nozzle assembly.

9. A gas turbine engine provided with a jet nozzle assembly as claimed in claim 1.

References Cited

UNITED STATES PATENTS 2,811,827  11/1957  Kress _____ 239—127.3

FOREIGN PATENTS 577,949  6/1946  Great Britain.

EVERETT W. KIRBY, *Primary Examiner.*